(12) United States Patent
Miura

(10) Patent No.: US 10,154,085 B2
(45) Date of Patent: Dec. 11, 2018

(54) SYSTEM, INFORMATION PROCESSING APPARATUS, INFORMATION PROCESSING METHOD, AND STORAGE MEDIUM

(71) Applicant: FUJI XEROX CO., LTD., Tokyo (JP)

(72) Inventor: Toru Miura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 177 days.

(21) Appl. No.: 15/208,885

(22) Filed: Jul. 13, 2016

(65) Prior Publication Data

US 2017/0195407 A1 Jul. 6, 2017

(30) Foreign Application Priority Data

Jan. 4, 2016 (JP) .................................. 2016-000221

(51) Int. Cl.
*H04L 29/06* (2006.01)
*H04L 29/08* (2006.01)

(52) U.S. Cl.
CPC ........ *H04L 67/1002* (2013.01); *H04L 63/083* (2013.01); *H04L 67/146* (2013.01); *H04L 63/0807* (2013.01)

(58) Field of Classification Search
CPC .. H04L 67/1002; H04L 67/146; H04L 63/083
See application file for complete search history.

(56) References Cited

U.S. PATENT DOCUMENTS 6,473,802 B2 * 10/2002 Masters .............. H04L 67/1008
709/219
7,954,144 B1 * 5/2011 Ebrahimi .............. H04L 63/102
709/227

* cited by examiner

*Primary Examiner* — Tri M Tran
(74) *Attorney, Agent, or Firm* — Oliff PLC

(57) ABSTRACT

An information processing apparatus includes a first reception unit that receives a first request from a client; a first transmitting unit that transmits the first request to a load balancer unit; a second reception unit that receives a response to the first request from the load balancer unit; a storage controller that controls to cause a storage device to store first information applied to the first request, and second information applied to the response, in an associated manner; and a second transmitting unit that transmits the response from which the second information is deleted, to the client.

13 Claims, 12 Drawing Sheets

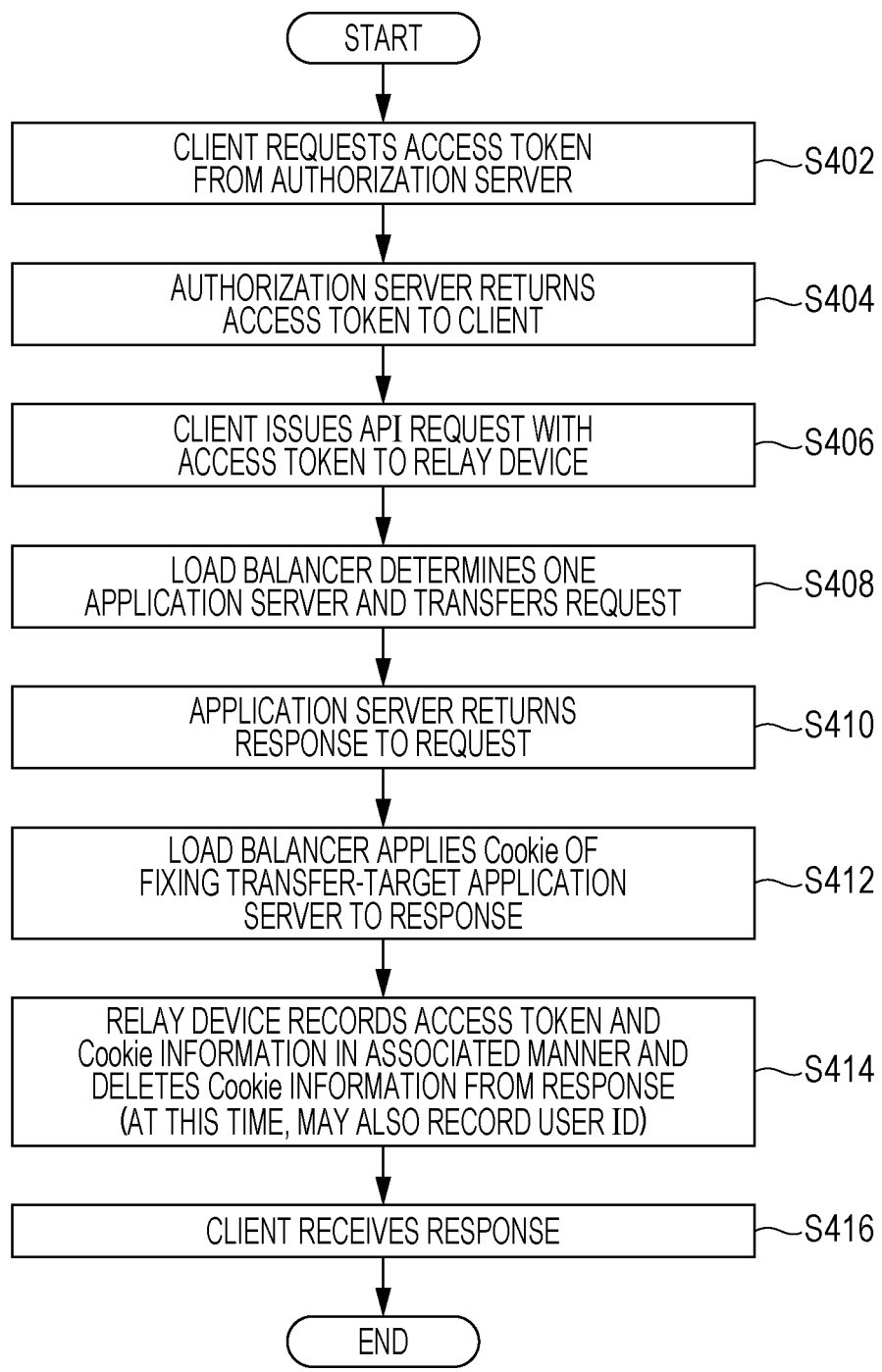

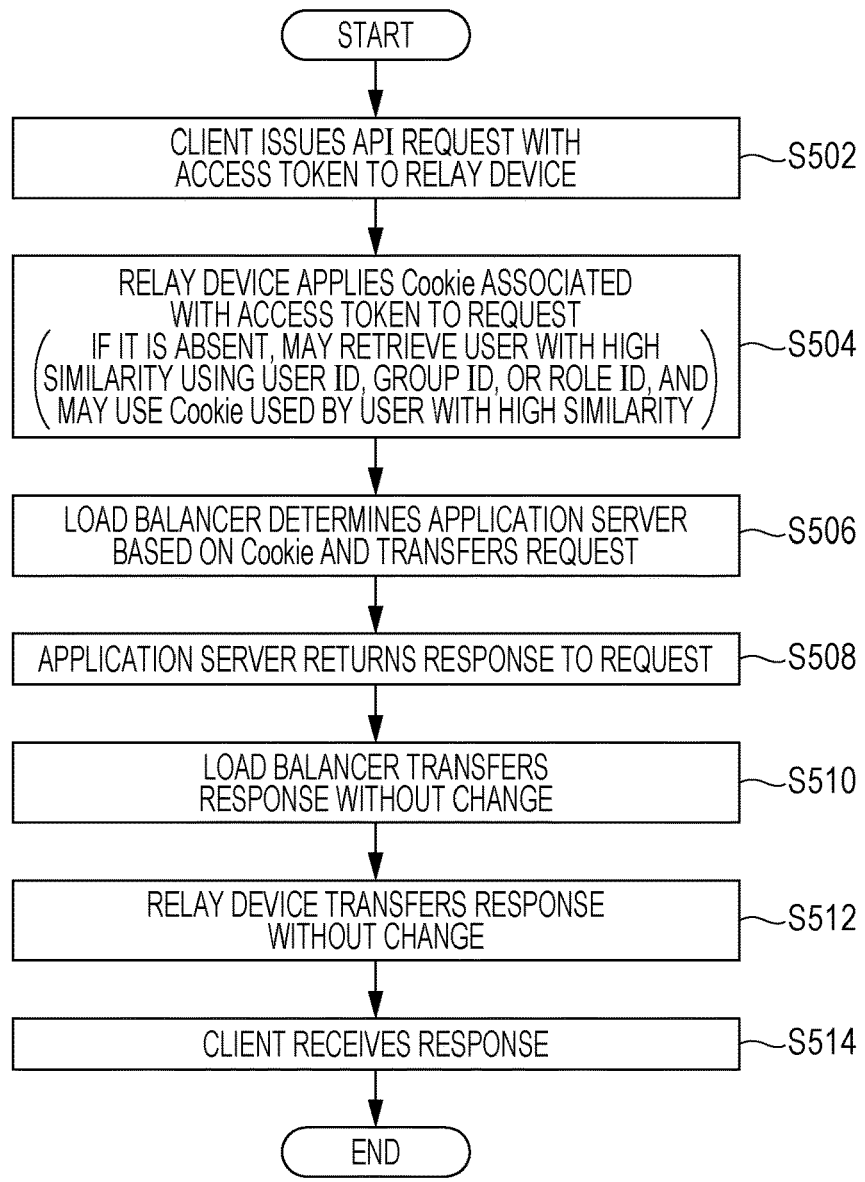

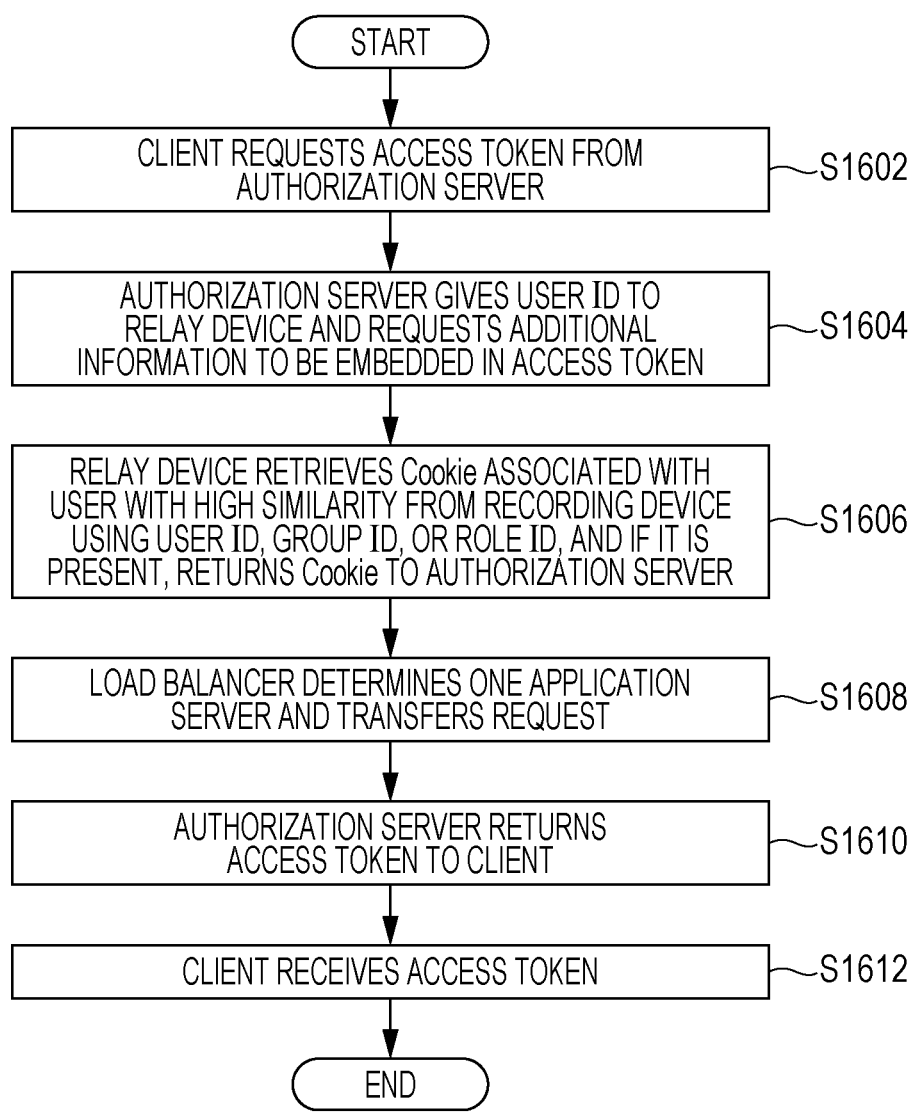

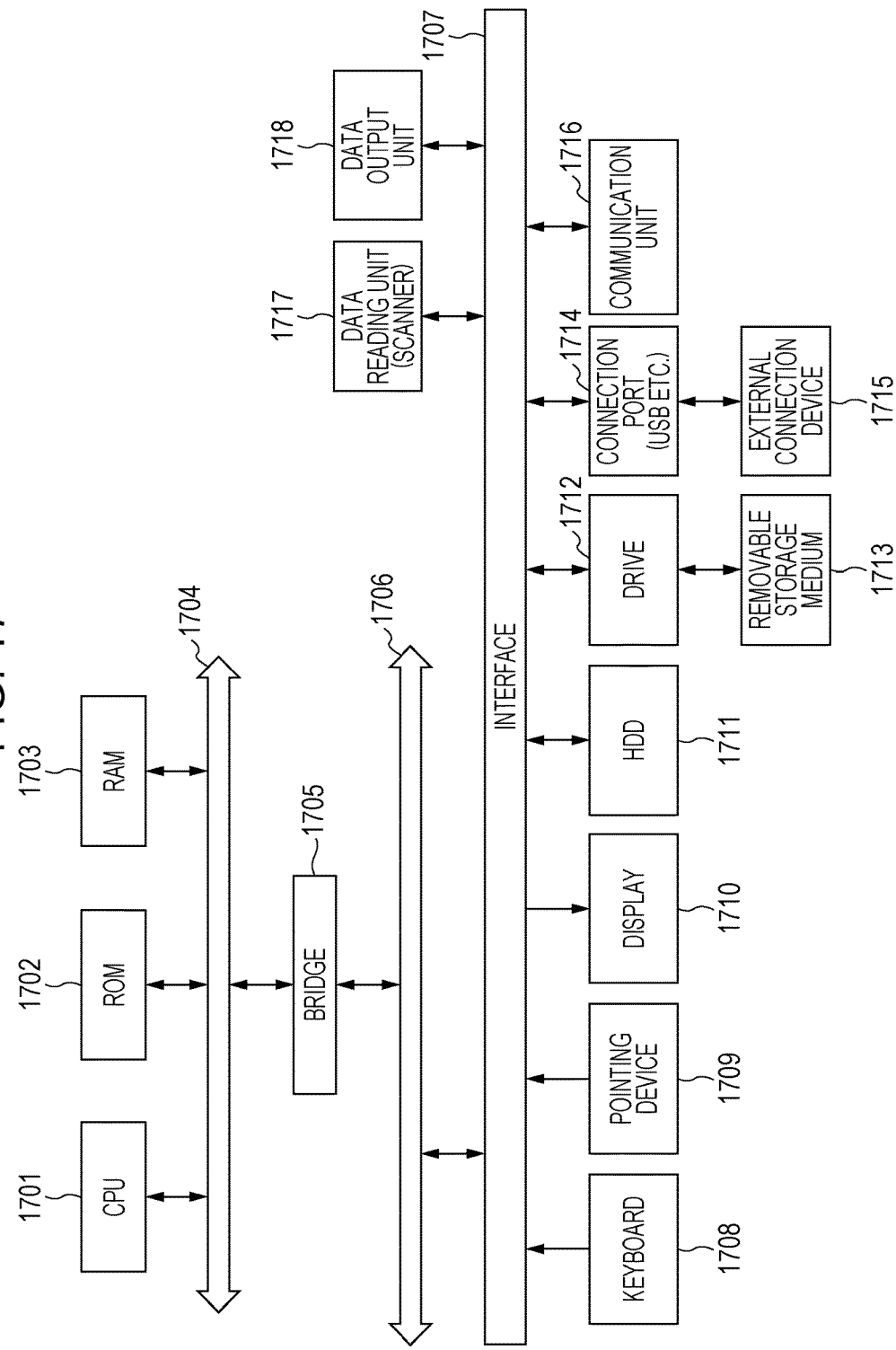

SYSTEM, INFORMATION PROCESSING APPARATUS, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2016-000221 filed Jan. 4, 2016.

BACKGROUND

The present invention relates to a system, an information processing apparatus, an information processing method, and a storage medium.

SUMMARY

According to an aspect of the invention, there is provided an information processing apparatus including a first reception unit that receives a first request from a client; a first transmitting unit that transmits the first request to a load balancer unit; a second reception unit that receives a response to the first request from the load balancer unit; a storage controller that controls to cause a storage device to store first information applied to the first request, and second information applied to the response, in an associated manner; and a second transmitting unit that transmits the response from which the second information is deleted, to the client.

BRIEF DESCRIPTION OF THE DRAWINGS

Exemplary embodiments of the present invention will be described in detail based on the following figures, wherein:

FIG. 4 is a flowchart showing a processing example according to the first exemplary embodiment;

FIG. 5 is a flowchart showing a processing example according to the first exemplary embodiment;

FIG. 6 is an explanatory illustration showing a data structure example of Cookie data;

FIG. 16 is a flowchart showing a processing example according to the third exemplary embodiment; and FIG. 17 is a block diagram showing a hardware configuration example of a computer that realizes any of the exemplary embodiments.

DETAILED DESCRIPTION

Exemplary embodiments desirable for realizing the invention are described below with reference to the drawings.

First Exemplary Embodiment

Figure 1:
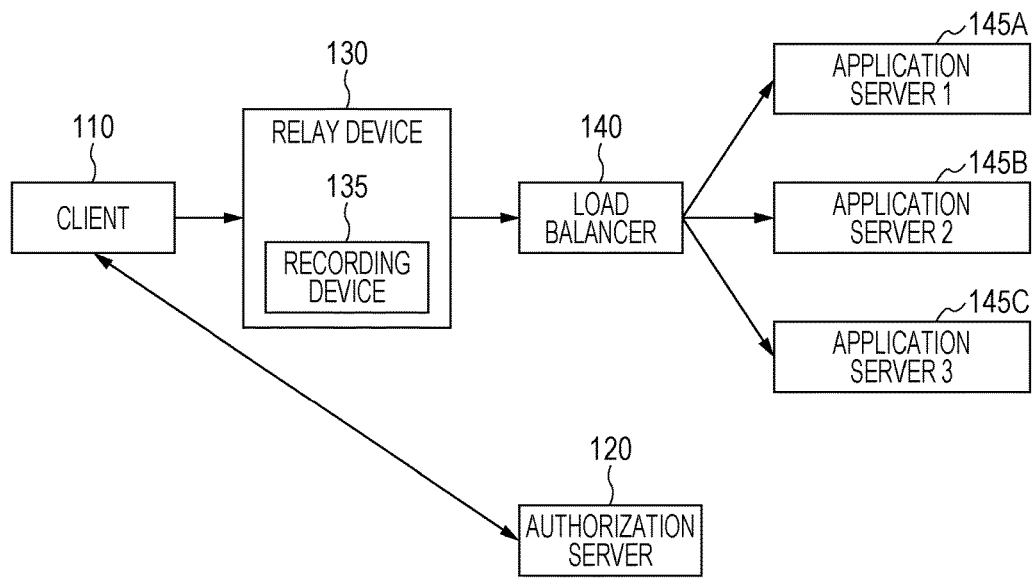
FIG. 1 is a conceptual module configuration diagram for a configuration example of a first exemplary embodiment.

FIG. 1 is a conceptual module configuration diagram for a configuration example of a first exemplary embodiment.

A module represents a component, such as software (a computer program) or hardware, which may be generally logically separated. Hence, a module in this exemplary embodiment represents not only a module being a computer program, but also a module being a hardware configuration. Therefore, description in this exemplary embodiment also involves a computer program that causes a computer to function as such a module (a program that causes a computer to execute respective steps, a program that causes a computer to function as respective units, and a program that causes a computer to provide respective functions), a system, and a method. For convenience of description, wordings "store," "cause . . . to store," and other wordings equivalent thereto are used. These wordings represent causing a storage device to store . . . or controlling a storage device to store . . . in the case in which the exemplary embodiment is a computer program. Also, modules may correspond to functions one by one. However, when being mounted or installed, a single module may be formed of a single program, plural modules may be formed of a single program, or a single module may be formed of plural programs. Also, plural modules may be executed by a single computer, or a single module may be executed by plural computers in a distributed or parallel environment. A single module may include another module. Also, "connection" is used for physical connection, and logical connection (for example, transmission and reception of data, an instruction, or reference relationship among data). An expression "predetermined" represents being determined before target processing. The situation includes a situation before processing according to any one of exemplary embodiments is started, and a situation even after processing according to this exemplary embodiment is started as long as the situation is before target processing. In other words, the expression "predetermined" is used as being determined in accordance with the condition and state of the current situation, or the condition and state of the previous situation. If there are plural "predetermined values," the values may be different, or two or more values (as a matter of course, all the values) may be the same. Also, an expression "if A, do B" is used as "determining whether A or not, and doing B if it is determined as A," unless otherwise the determination whether A or not is not required.

Also, a system or an apparatus includes a case in which a system or an apparatus is formed of plural computers, hardware, plural devices, etc., connected by a communication measure such as a network (including communication connection in a one-to-one correspondence), and a case in which a system or an apparatus is provided by a single computer, hardware, a single device, etc. An "apparatus" and a "system" are used as mutually equivalent words. As a matter of course, a "system" does not include a social "scheme" (social system) that is merely an artificial agreement.

Also, target information is read from a storage device every processing of each module or every processing if plural steps of processing are executed in a module, and after the processing, the processing result is written out to the storage device. Hence, the description of reading the information from the storage device before the processing and writing out the processing result to the storage device after the processing may be occasionally omitted. A storage device in this case may include a hard disk, a random access memory (RAM), an external storage medium, a storage device arranged via a communication line, and a register in a central processing unit (CPU).

In an information processing system according to a first exemplary embodiment, an application server 145 executes processing in response to a request from a client 110. As shown in the example in FIG. 1, the information processing system includes a client 110, an authorization server 120, a relay device 130, a load balancer 140, an application server 1: 145A, an application server 2: 145B, and an application server 3: 145C. FIG. 1 exemplarily illustrates the three application servers 145; however, as long as plural application servers 145 are used, the number may be desirably determined. Connection through a communication line is provided between the client 110 and the authorization server 120, between the client 110 and the relay device 130, between the relay device 130 and the load balancer 140, and between the load balancer 140 and each application server 145.

It is to be noted that "first information" described in the claims may be, for example, an access token or information having a function equivalent to the access token (in this case, a function of certifying the same client). Hereinafter, an access token is described below as an example of the first information. Also, "second information" may be a Cookie or information having a function equivalent to the Cookie (in this case, a function of designating an application server). Hereinafter, a Cookie is described below as an example of the second information. A "load balancer unit" may be any one of, for example, a load balancer 140 shown in FIGS. 1, 9, and 14, a load balance processing module 235 shown in FIG. 2, a load balance processing module 1035 shown in FIG. 10, and a load balance processing module 1532 shown in FIG. 15.

The relay device 130 is arranged between the client 110 and the load balancer 140. The relay device 130 generates a Cookie, which is interpreted by the load balancer 140, from an access token, and when the relay device 130 transfers a request to the load balancer 140, the relay device 130 applies the Cookie to the request. Hence, the same application server 145 is able to process plural requests from the client 110 according to REST API (that is, while the client 110 does not use the Cookie or the application server 145 does not use the Cookie). The same application server 145 executes the processing because, for example, a user may execute the processing more efficiently as compared with that different application servers 145 execute the processing, and if processing relates to the user, the user may use the previous processing result relating to the user.

The client 110 is connected with the authorization server 120 and the relay device 130. The client 110 is an information processing apparatus having a communication function and used by a user. For example, the client 110 may be a personal computer (PC, which may be a notebook PC), a mobile terminal (a mobile phone including a smart phone), or a wearable terminal (wrist-band type (bracelet type), watch type, glasses type mounted on the head). The client 110 acquires an access token from the authorization server 120, and transmits a request with the access token applied to the relay device 130.

To be specific, the client 110 is a client that uses the application server 145, and executes an application programming interface (API) call through the relay device 130 and the load balancer 140. Before the client 110 executes the API call, the client 110 acquires an access token from the authorization server 120.

The authorization server 120 is connected with the client 110. The authorization server 120 has a communication function. The authorization server 120 generates an access token in response to a request from the client 110, and transmits the access token to the client 110. The access token in this case is information which certifies that the client 110 (or the user using the client 110) is able to use the application server 145. For example, the access token may be a character string for identifying an authenticated user. To generate an access token, a user performs a login operation with the client 110 (reception with a user name and a password (possibly including biometric authentication such as fingerprint authentication)). The access token typically has a time-limit.

To be specific, the authorization server 120 generates an access token indicating the authority to the API call. In the first exemplary embodiment, the configuration does not rely on the scheme of the authorization. However, for example, OAuth2 (https://tools.ietf.org/html/rfc6749) may be used. Since the access token issued by the authorization server 120 is transparent to (meaningless for) the client 110, an arbitrary character string is used. However, in general, JWT (https://tools.ietf.org/html/rfc7519) is used.

The relay device 130 includes a recording device 135. The relay device 130 is connected with the client 110 and the load balancer 140. The relay device 130 has a communication function, and is present between the client 110 and the load balancer 140. To make an access from the client 110 to the load balancer 140 or from the load balancer 140 to the client 110, the access is made through the relay device 130.

The relay device 130 executes control to cause the recording device 135 to store an access token (an exemplary form of first information) applied to a request received from the client 110, and a Cookie (an exemplary form of second information) applied to a response received from the load balancer 140 (an exemplary form of a load balancer unit), in an associated manner. As described above, for the first information, the access token acquired by the client 110 from the authorization server 120 is used, and for the second information, the Cookie issued by the load balancer 140 is used.

The relay device 130 deletes the Cookie from the response received from the load balancer 140, and transmits a response after the Cookie is deleted to the client 110.

Also, the relay device 130 may retrieve the access token applied to the request received from the client 110, from the recording device 135, apply a Cookie corresponding to the access token to the request, and transmit the request with the Cookie applied, to the load balancer 140.

To be specific, the relay device 130 relays the API call (the request including the access token) from the client 110 to the application server 145. During the relay, the relay device 130 applies the Cookie to be used by the load balancer 140 from the access token. In the first exemplary embodiment, the Cookie generated by the load balancer 140 is first associated with the access token and stored in the recording device 135, and when a request is provided with the same access token next time, the relay device 130 applies the Cookie to the request and transfers the request to the load balancer 140 (finally, the application server 145).

Figure 7:
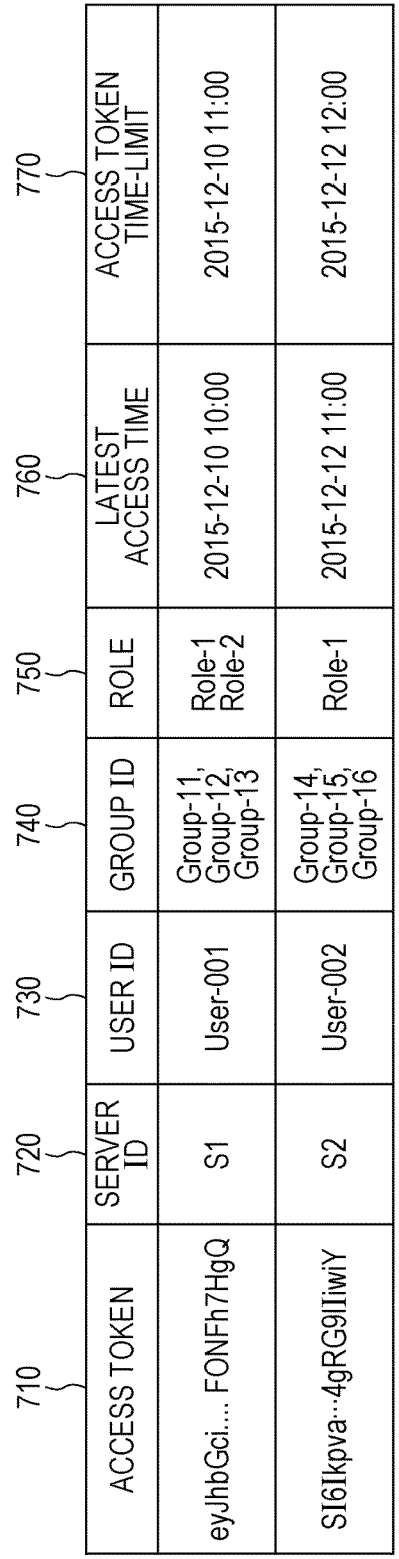
FIG. 7 is an explanatory illustration showing a data structure example of a relational table.

The recording device 135 associates the access token with the Cookie and stores them (the pair of the access token and the Cookie). For example, the recording device 135 stores a relational table 700. FIG. 7 is an explanatory illustration showing a data structure example of the relational table 700. The relational table 700 includes an access token column 710, a server ID column 720, a user ID column 730, a group ID column 740, a role column 750, a latest access time column 760, and an access token time-limit column 770. The access token column 710 stores an access token. The server ID column 720 stores information for uniquely identifying an application server 145 (server identification (ID)) according to this exemplary embodiment. The user ID column 730 stores information for uniquely identifying a user (user ID) according to this exemplary embodiment. The group ID column 740 stores information for uniquely identifying a group (group ID) according to this exemplary embodiment. The role column 750 stores a role (being an exemplary form of "information indicating a role of a user" and including role, position, task, class, and so forth) owned by the user or group. The latest access time column 760 stores the latest access time (the newest access time) by the user to the application server 145. The access token time-limit column 770 stores the time-limit of the access token.

The information in the server ID column 720 is information extracted from the Cookie applied to the response obtained from the load balancer 140. Hence, the access token and the Cookie are associated with each other. The information in the latest access time column 760 and the access token time-limit column 770 is used to determine deletion of associated data present in the row of the relational table 700. For example, if the current time is after a predetermined period elapses since the time in the latest access time column 760, the associated data in the row may be deleted. Also, if the current time is after the effective time-limit in the access token time-limit column 770 elapses, the associated data in the row may be deleted.

Figure 8:
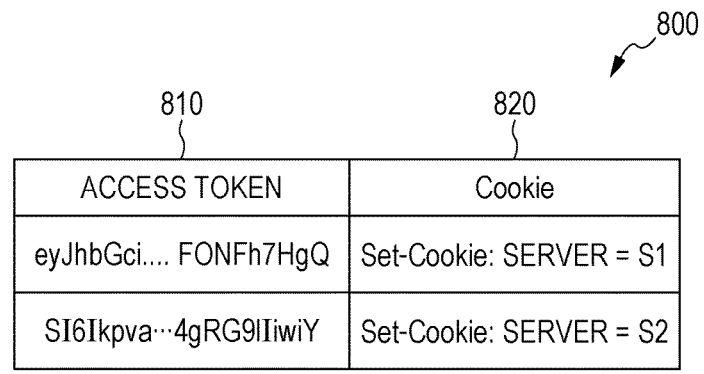
FIG. 8 is an explanatory illustration showing a data structure example of a relational table.

Also, the recording device 135 may store a relational table 800. FIG. 8 is an explanatory illustration showing a data structure example of the relational table 800. The relational table 800 includes an access token column 810 and a Cookie column 820. The access token column 810 stores an access token. The Cookie column 820 stores a Cookie corresponding to the access token.

The load balancer 140 is connected with the relay device 130, the application server 1: 145A, the application server 2: 145B, and the application server 3: 145C. The load balancer 140 has a communication function and is a load balancing device. The load balancer 140 distributes requests transmitted from the client 110 into at least two application servers 145, and causes the application servers 145 to execute processing (balancing processing). For the method of assigning the requests, an existing method may be used. For example, a round-robin method of equally sequentially assigning requests to the respective application servers 145 may be employed. For the load balancer 140 in this case, an existing load balancer may be employed. To be specific, to allow the same application server 145 to process a request from the same client 110 (or user), when the load balancer 140 receives a processing result from the application server 145, the load balancer 140 applies a Cookie to the processing result, and transmits the processing result with the Cookie applied, to the client 110 through the relay device 130.

To be specific, the load balancer 140 transfers requests from the client 110 to the downstream application servers 145 in a distributed manner. To transfer requests from the same client 110 to the same application server 145, information for determining a transfer target is embedded in the Cookie. For example, Cookie data 600 shown in FIG. 6 is embedded in the Cookie. The Cookie data 600 indicates an example of Cookie information set by the load balancer 140, and more specifically, represents that "S1" is designated for the application server 145 which executes the processing.

Each application server 145 is connected with the load balancer 140. The application server 145 has a communication function, executes processing in accordance with a request from the load balancer 140, and returns a processing result thereof to the load balancer 140.

Figure 2:
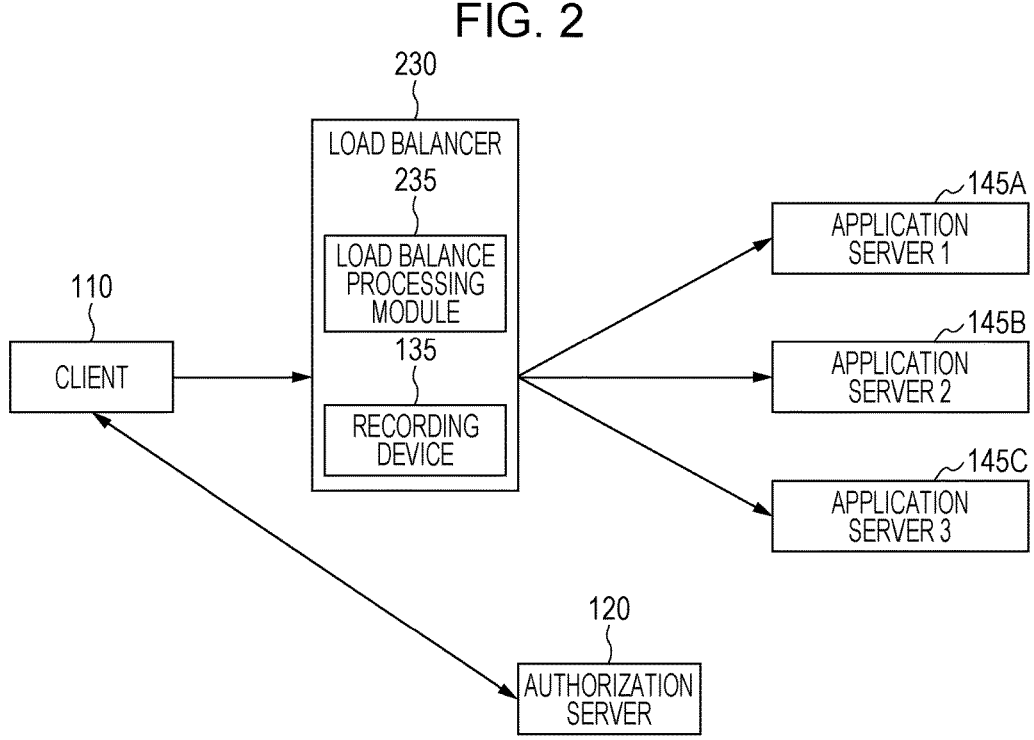
FIG. 2 is a conceptual module configuration diagram for a configuration example of the first exemplary embodiment.

FIG. 2 is a conceptual module configuration diagram for a configuration example of the first exemplary embodiment. The module configuration is different from that of the first exemplary embodiment shown in the example in FIG. 1. A load balancer 230 shown in the example in FIG. 2 is a combination of the relay device 130 and the load balancer 140 shown in the example in FIG. 1, and has both functions. Also, the load balance processing module 235 has the function of the load balancer 140.

The client 110 is connected with the authorization server 120 and the load balancer 230.

The authorization server 120 is connected with the client 110.

The load balancer 230 includes the load balance processing module 235 and the recording device 135, and is connected with the client 110, the application server 1: 145A, the application server 2: 145B, and the application server 3: 145C.

Each application server 145 is connected with the load balancer 230.

Figure 3:
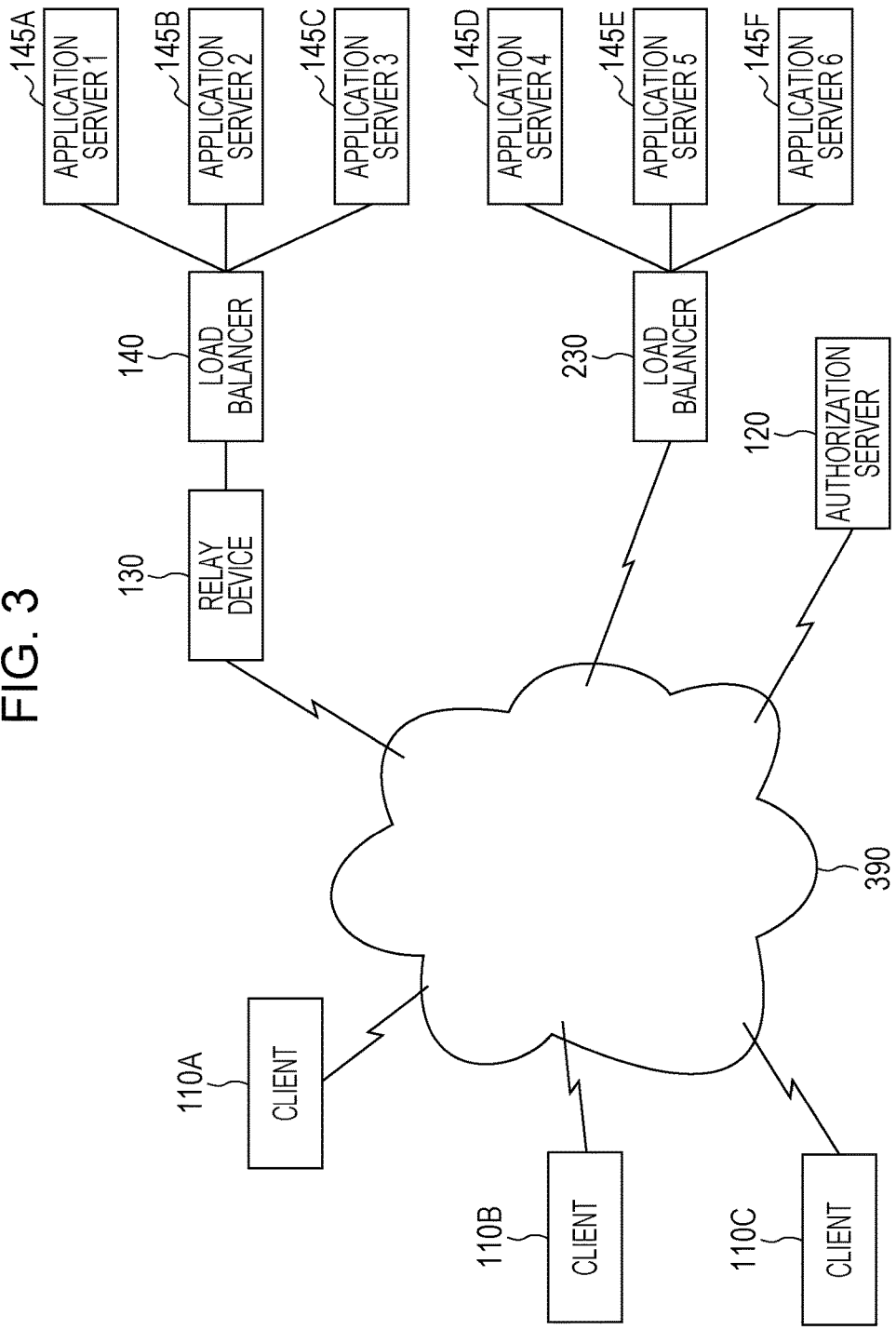
FIG. 3 is an explanatory illustration showing a system configuration example in which this exemplary embodiment is used.

FIG. 3 is an explanatory illustration showing a system configuration example in which this exemplary embodiment is used.

A client 110A, a client 110B, a client 110C, the authorization server 120, the relay device 130, and the load balancer 230 are connected with each other through a communication line 390. The communication line 390 may be wireless or wired, or a combination of wireless and wired configurations. For example, the communication line 390 may be the Internet, an intranet, or the like, as a communication infrastructure. The load balancer 140 is connected with application servers 1 to 3: 145A to 145C, and the load balancer 230 is connected with application servers 4 to 6: 145D to 145F. Also, the functions of the relay device 130 (which may include the load balancer 140, the application server 1: 145A, etc.) and the load balancer 230 (which may include the application server 4: 145D, etc.) may be realized as a cloud service. As a matter of course, the numbers of the clients 110, authorization servers 120, relay devices 130, and load balancers 230 may be the numbers other than the numbers shown in the example in FIG. 3.

A service (the application server 1: 145A etc. or the application server 4: 145D etc.) is provided from each homepage by using a browser or the like of each client 110. In accordance with an operation by a user, a request is transmitted to the application server 145, and a service (processing in response to the request) by the application server 145 etc. is provided. In this case, a Cookie is not used between the application server 145 and the client 110 in accordance with REST API. However, a request from the same client 110 may become processed by the same application server 145 with the relay device 130 and the load balancer 140 (or the load balancer 230).

FIG. 4 is a flowchart showing a processing example according to the first exemplary embodiment. The flowchart indicates a processing example when an initial request is provided from the client 110.

In step S402, the client 110 requests an access token from the authorization server 120.

In step S404, the authorization server 120 returns the access token to the client 110.

In step S406, the client 110 issues an API request with the access token to the relay device 130.

In step S408, the load balancer 140 determines one application server 145 and transfers the request.

In step S410, the application server 145 returns a response to the request.

In step S412, the load balancer 140 applies a Cookie of fixing the transfer-target application server 145 to the response.

In step S414, the relay device 130 records the access token and information on the Cookie in an associated manner and deletes the Cookie information from the response. At this time, the relay device 130 may also record the user ID.

In step S416, the client 110 receives a response. The response in this case is data without the Cookie applied (equivalent to the response in step S410).

FIG. 5 is a flowchart showing a processing example according to the first exemplary embodiment. The flowchart indicates a processing example when a second or later request is provided from the client 110. That is, the flowchart indicates processing executed in response to a request issued by the client 110 after the processing in the flowchart shown in the example in FIG. 4 is executed.

In step S502, the client 110 issues an API request with an access token to the relay device 130. The access token in this case is an access token acquired by the processing in the flowchart shown in the example in FIG. 4.

In step S504, the relay device 130 applies a Cookie associated with the access token to the request. If the Cookie associated with the access token is absent, the relay device 130 may retrieve a user with high similarity using the user ID, group ID, or role ID, and may use a Cookie used by the user with high similarity.

In step S506, the load balancer 140 determines the application server 145 based on the Cookie and transfers the request.

In step S508, the application server 145 returns a response to the request.

In step S510, the load balancer 140 transfers the response without a change.

In step S512, the relay device 130 transfers the response without a change.

In step S514, the client 110 receives the response.

In the processing in the flowchart shown in the example in FIG. 5, since the pair of the access token and the Cookie is stored in the recording device 135, the response is transferred without a change in step S510 and step S512. However, a Cookie may be applied in order to cause the load balancer 140 to execute the same processing in the flowchart shown in the example in FIG. 4 and the flowchart shown in the example in FIG. 5 (that is, in order to eliminate the necessity of distinction between the flowchart shown in the example in FIG. 4 and the flowchart shown in the example in FIG. 5). In this case, the relay device 130 may delete the Cookie in step S512.

Second Exemplary Embodiment

Figure 9:
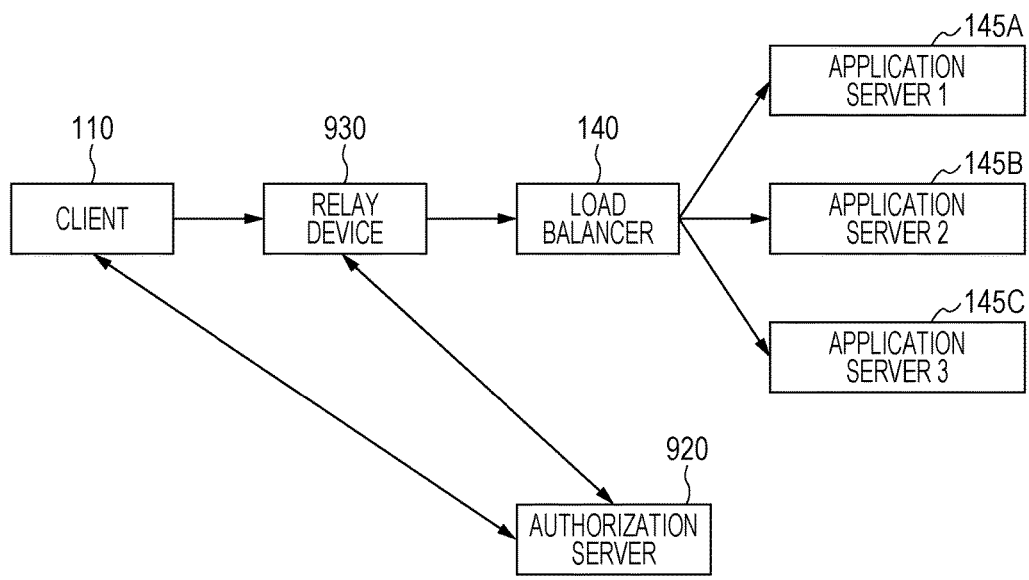
FIG. 9 is a conceptual module configuration diagram for a configuration example of a second exemplary embodiment.

FIG. 9 is a conceptual module configuration diagram for a configuration example of a second exemplary embodiment. The same reference signs are applied to portions of the same kinds to those of the above-described exemplary embodiment, and the description thereof is omitted (this will be applied to the following description). In the second exemplary embodiment, it is no longer required to record the pair of the Cookie and the access token unlike the first exemplary embodiment, and hence the required memory capacity may be decreased.

The client 110 is connected with an authorization server 920 and a relay device 930.

The authorization server 920 is connected with the client 110 and the relay device 930. The authorization server 920 executes access-token generation processing equivalent to the authorization server 120 according to the first exemplary embodiment; however, requests a Cookie, which is applied to the generated access token, from the relay device 930. Then, the authorization server 920 receives the Cookie from the relay device 930, embeds the Cookie in the access token, and gives the access token (the access token with the Cookie applied) to the client 110.

Alternatively, the authorization server 920 may execute the access-token generation processing, and give the generated access token to the relay device 930. The relay device 930 may apply a Cookie to the access token. Then, the relay device 930 may give the access token (the access token with the Cookie applied) to the client 110. Still alternatively, the relay device 930 may give the access token (the access token with the Cookie applied) to the authorization server 920, and the authorization server 920 may give the access token to the client 110.

The relay device 930 is connected with the client 110, the authorization server 920, and the load balancer 140. The relay device 930 receives the access token from the authorization server 920. The relay device 930 transmits a certain request to the load balancer 140. The request in this case is a request only for generation of a Cookie, and may not cause the application server 145 to execute actual processing. As a matter of course, the request may cause the application server 145 to execute the actual processing. Then, the relay device 930 receives a Cookie applied to a response to the request, from the load balancer 140. Then, the relay device 930 transmits the Cookie to the authorization server 920.

Alternatively, the relay device 930 may extract a Cookie from an access token applied to a request received from the client 110, and may apply the Cookie to the request. The processing of "applying" in this relay device 930 is processing of applying Cookie information extracted from an access token to a request so that the Cookie information function as a Cookie originally intended.

Then, the relay device 930 may transmit the request, the access token, and the Cookie (the request with the access token and the Cookie applied) to the load balancer 140.

To be specific, the relay device 930 relays the API call (the request including the access token) from the client 110 to the application server 145. During the relay, the relay device 930 applies the Cookie to be used by the load balancer 140 from the access token. In the second exemplary embodiment, in cooperation with the authorization server 920, the Cookie information generated by the load balancer 140 is embedded in the access token issued by the authorization server 920, and the access token is provided to the client 110. Processing of embedding the Cookie information and processing of transmitting the access token to the client 110 may be executed by the relay device 930 or the authorization server 920.

The load balancer 140 is connected with the relay device 930, the application server 1: 145A, the application server 2: 145B, and the application server 3: 145C.

Each application server 145 is connected with the load balancer 140.

Figure 10:
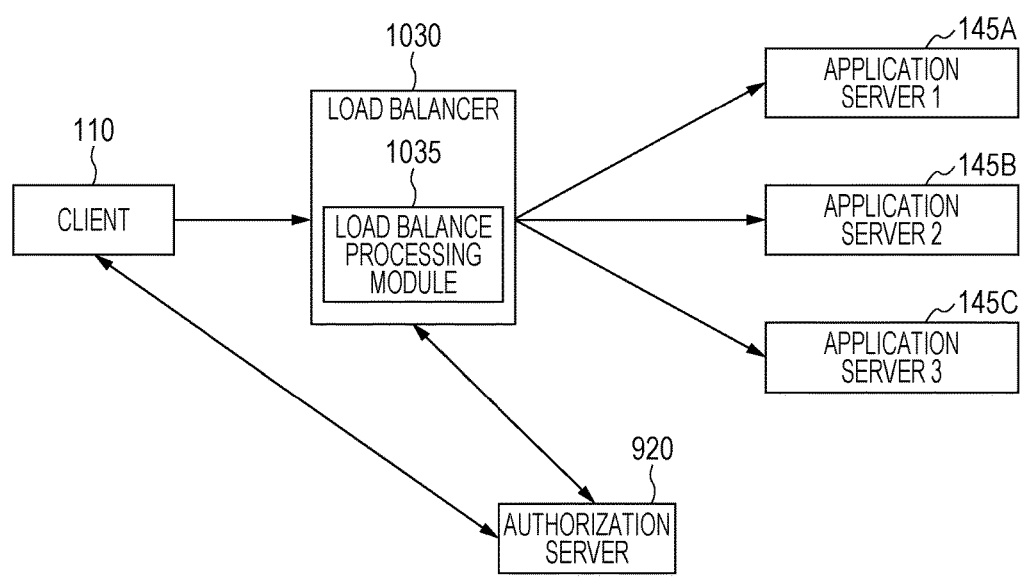
FIG. 10 is a conceptual module configuration diagram for a configuration example of the second exemplary embodiment.

FIG. 10 is a conceptual module configuration diagram for a configuration example of the second exemplary embodiment. The module configuration is different from that of the second exemplary embodiment shown in the example in FIG. 9. A load balancer 1030 shown in the example in FIG. 10 is a combination of the relay device 930 and the load balancer 140 shown in the example in FIG. 9, and has both functions. Also, the load balance processing module 1035 has the function of the load balancer 140.

The client 110 is connected with the authorization server 920 and the load balancer 1030.

The authorization server 920 is connected with the client 110 and the load balancer 1030.

The load balancer 1030 is connected with the client 110, the authorization server 920, the application server 1: 145A, the application server 2: 145B, and the application server 3: 145C.

Each application server 145 is connected with the load balancer 1030.

Figure 11:
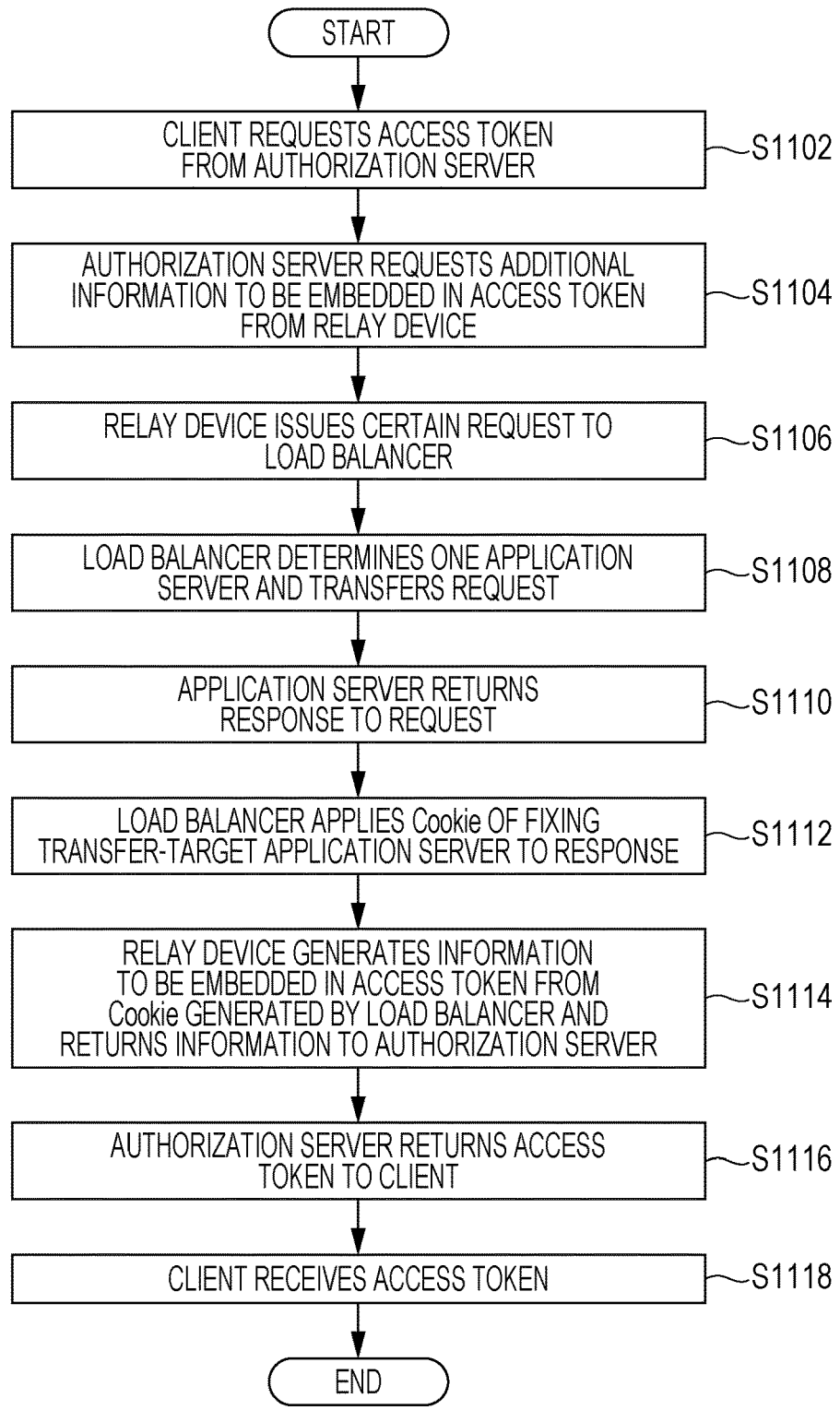
FIG. 11 is a flowchart showing a processing example according to the second exemplary embodiment.

FIG. 11 is a flowchart showing a processing example according to the second exemplary embodiment. The flowchart shows an access-token issue processing example.

In step S1102, the client 110 requests an access token from the authorization server 920.

In step S1104, the authorization server 920 requests additional information (Cookie information) to be embedded in the access token, from the relay device 930.

In step S1106, the relay device 930 issues a certain request to the load balancer 140. As described above, the request in this case is a request only for generation of a Cookie, and may not cause the application server 145 to execute actual processing (for example, processing of merely making a reply). As a matter of course, the request may be for execution of the actual processing.

In step S1108, the load balancer 140 determines one application server 145 and transfers the request.

In step S1110, the application server 145 returns a response to the request.

In step S1112, the load balancer 140 applies a Cookie of fixing the transfer-target application server 145 to a response.

In step S1114, the relay device 930 generates information to be embedded in the access token from the Cookie generated by the load balancer 140 and returns the information to the authorization server 920.

Figure 13:
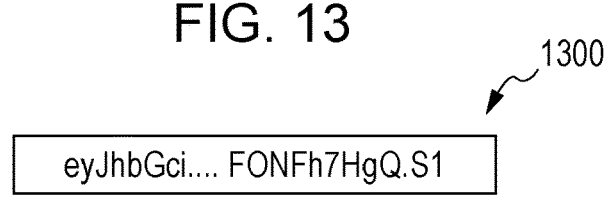
FIG. 13 is an explanatory illustration showing a data structure example of access token data.

In step S1116, the authorization server 920 returns the access token to the client 110. The authorization server 920 generates, for example, access token data 1300. FIG. 13 is an explanatory illustration showing a data structure example of the access token data 1300. A server ID (identification information of the application server 145, "S1" in the example in FIG. 13) included in the Cookie set by the load balancer 140 (the load balance processing module 1035) is applied to the end of the access token data 1300 (at the right side of "." (period) in the example in FIG. 13).

In step S1118, the client 110 receives the access token (the access token with the Cookie embedded).

Figure 12:
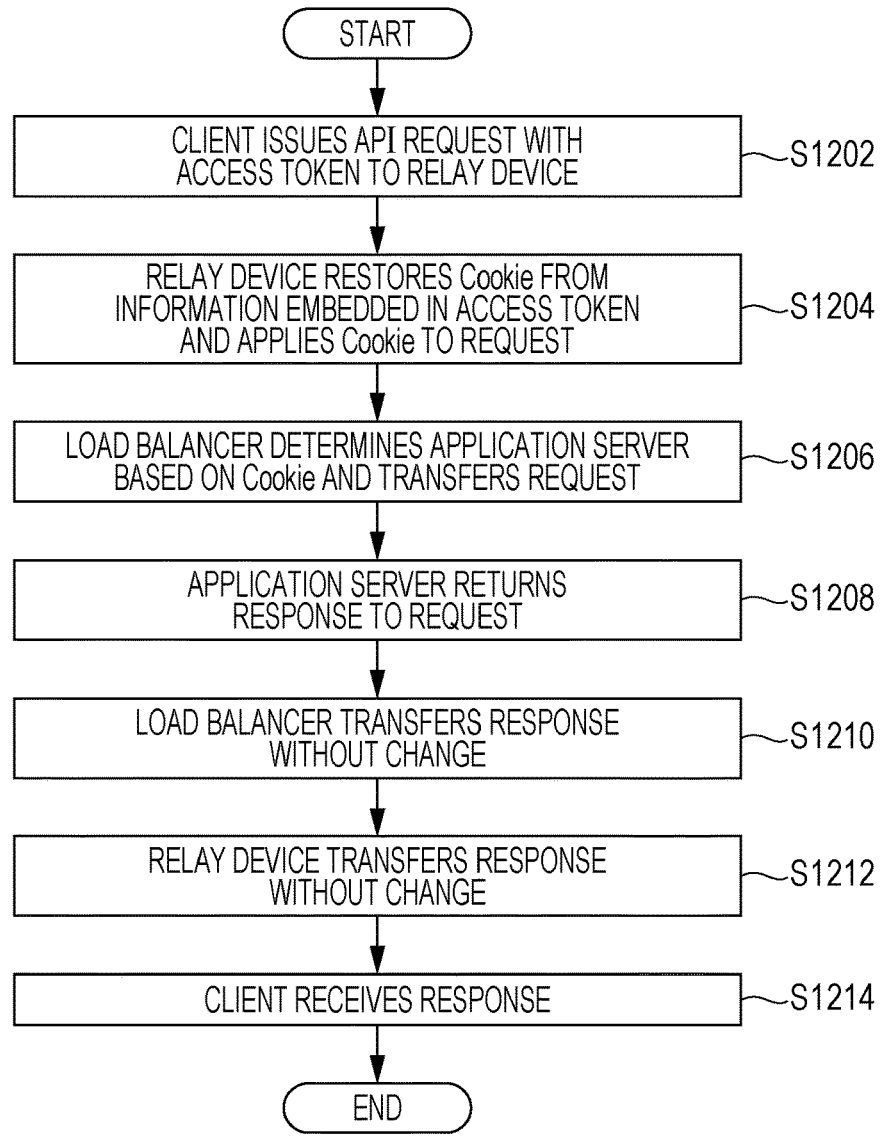
FIG. 12 is a flowchart showing a processing example according to the second exemplary embodiment.

FIG. 12 is a flowchart showing a processing example according to the second exemplary embodiment. The flowchart shows an API access processing example. For execution of this API access processing, it is required that the access-token generation processing (the processing in the flowchart shown in the example in FIG. 11) has been executed.

In step S1202, the client 110 issues an API request with an access token to the relay device 930. The access token in this case is after the processing in the flowchart shown in the example in FIG. 11, and hence has the Cookie information embedded therein.

In step S1204, the relay device 930 restores the Cookie from the information embedded in the access token and applies the Cookie to the request.

In step S1206, the load balancer 140 determines the application server 145 based on the Cookie and transfers the request.

In step S1208, the application server 145 returns a response to the request.

In step S1210, the load balancer 140 transfers the response without a change.

In step S1212, the relay device 930 transfers the response without a change.

In step S1214, the client 110 receives the response.

Third Exemplary Embodiment

Figure 14:
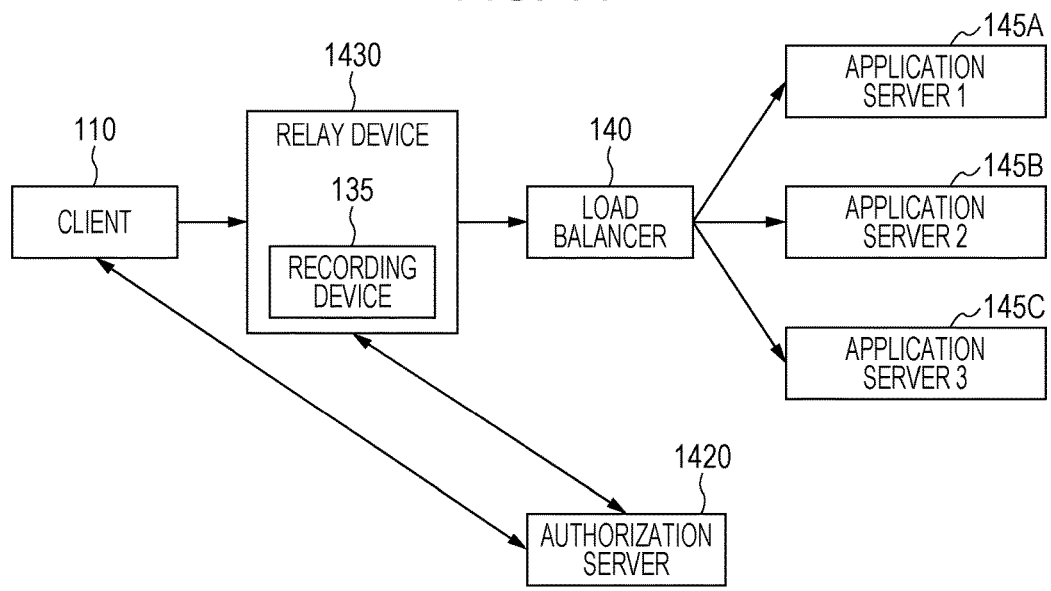
FIG. 14 is a conceptual module configuration diagram for a configuration example of a third exemplary embodiment.

FIG. 14 is a conceptual module configuration diagram for a configuration example of a third exemplary embodiment. This is a combination of the first exemplary embodiment (recording mode) and the second exemplary embodiment (embedding mode).

In the first exemplary embodiment, the amount of excessive processing, such as making the certain request according to the second exemplary embodiment, is decreased. However, a certain memory capacity is required to keep the association between the access token and the Cookie.

In the second exemplary embodiment, before the information is embedded in the access token, it is required to transmit a certain HTTP request from the relay device 930 to the load balancer 140 once to determine to which application server 145 the request is transmitted. However, it is not required to keep the association between the access token and the Cookie, and hence the certain memory capacity is not required.

In the third exemplary embodiment, the processing of embedding the Cookie information in the access token is executed by using the recording device 135 according to the first exemplary embodiment.

The client 110 is connected with an authorization server 1420 and a relay device 1430.

The authorization server 1420 is connected with the client 110 and the relay device 1430. The authorization server 1420 executes processing equivalent to that of the authorization server 920.

The relay device 1430 includes the recording device 135. The relay device 1430 is connected with the client 110, the authorization server 1420, and the load balancer 140. The relay device 1430 receives information relating to a user from the authorization server 1420.

Then, the relay device 1430 executes control to cause the recording device 135 to store the information relating to the user who made the request and a Cookie applied to a response received from the load balancer 140 in response to the request, in an associated manner. For example, the recording device 135 stores the relational table 700.

Information relating to a user similar to the received information relating to the user is retrieved from the recording device 135, and a Cookie corresponding to the retrieved information relating to the user to the authorization server 1420.

For the information relating to the user in this case, one or a combination of identification information for identifying the user, identification information for identifying a group to which the user belongs, information indicating a role of the user, and information indicating a resource accessible by the user may be used.

For example, the relay device 1430 according to the third exemplary embodiment re-uses a Cookie of the same user by using a user ID included in an access token. By assigning a request from the user being the same as the last time to the same application server 145, the possibility that the authority, attribute, resource to which the user makes an access, etc., of the user are already cached in the application server 145 is increased, and the performance is increased.

Also, the relay device 1430 according to the third exemplary embodiment may determine a role (an ordinary user, an administrator, etc.) assigned to the group to which the user belongs or the user from user ID information included in the access token, and may re-use the Cookie to transfer the request to the application server 145 used by a user of a similar group or role (including the same group or role). In general, to check the authority of the user, it is required to investigate the authority owned by the group to which the user belongs or the authority assigned to the user. By transferring an access from the same group or role to the same application server 145, the possibility that the authority, attribute, resource to which the user makes an access, etc., of the group or role are already loaded in the memory of the application server 145 is increased, and the performance is increased.

Also, the relay device 1430 according to the third exemplary embodiment may re-use the Cookie to transfer the request to the application server 145 used by a user having similar scope information, from scope information included in an access token. The scope is an identifier that declares an accessible resource. The possibility that the resource to which the user makes an access is already cached is increased, and the performance is increased.

The load balancer 140 is connected with the relay device 1430, the application server 1: 145A, the application server 2: 145B, and the application server 3: 145C.

Each application server 145 is connected with the load balancer 140.

Figure 15:
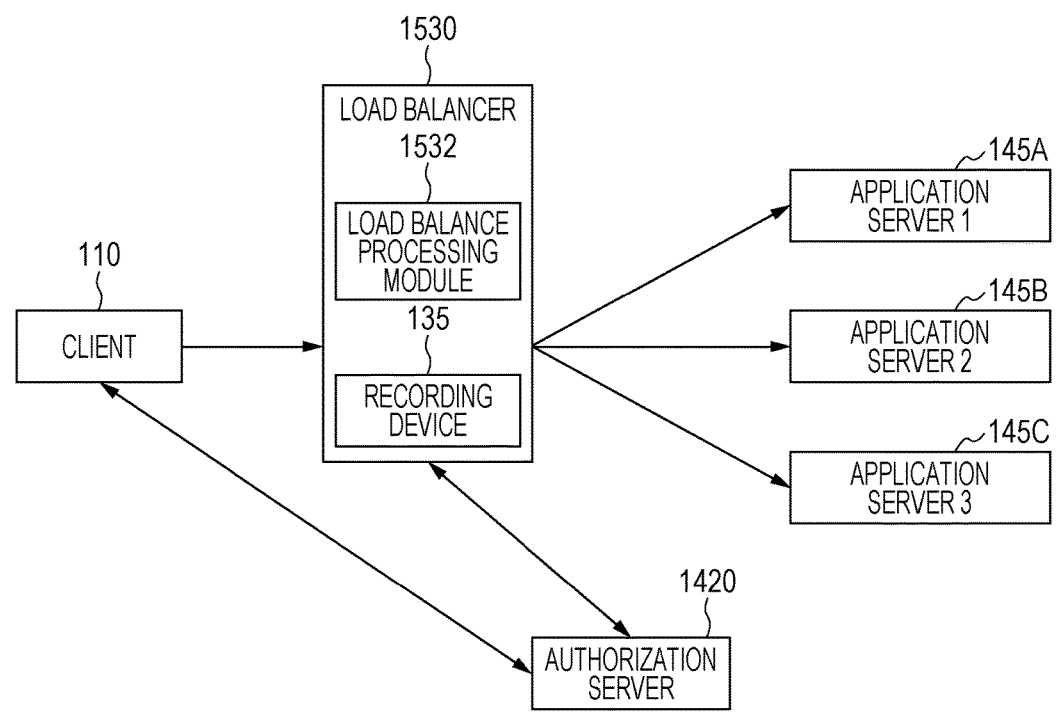
FIG. 15 is a conceptual module configuration diagram for a configuration example of the third exemplary embodiment.

FIG. 15 is a conceptual module configuration diagram for a configuration example of the third exemplary embodiment. The module configuration is different from that of the third exemplary embodiment shown in the example in FIG. 14. A load balancer 1530 shown in the example in FIG. 15 is a combination of the relay device 1430 and the load balancer 140 shown in the example in FIG. 14, and has both functions. Also, the load balance processing module 1532 has the function of the load balancer 140.

The client 110 is connected with the authorization server 1420 and the load balancer 1530.

The authorization server 1420 is connected with the client 110 and the load balancer 1530.

The load balancer 1530 includes the load balance processing module 1532 and the recording device 135, and is connected with the client 110, the authorization server 1420, the application server 1: 145A, the application server 2: 145B, and the application server 3: 145C.

Each application server 145 is connected with the load balancer 1530.

FIG. 16 is a flowchart showing a processing example according to the third exemplary embodiment. The flowchart indicates a processing example of using a Cookie of a similar user in the recording device 135.

In step S1602, the client 110 requests an access token from the authorization server 1420.

In step S1604, the authorization server 1420 gives a user ID to the relay device 1430 and requests additional information to be embedded in the access token.

In step S1606, the relay device 1430 retrieves a Cookie associated with a user with high similarity from the recording device 135 using a user ID, a group ID, or a role ID, and if it is present, returns the Cookie to the authorization server 1420.

In step S1608, the load balancer 1530 determines one application server 145 and transfers the request. Alternatively, the processing in step S1608 may be executed if the Cookie associated with the user with high similarity is not present in the recording device 135 in step S1606. Then, after the processing in step S1106 in the flowchart shown in the example in FIG. 11 is executed, the processing in step S1608 may be executed, and the processing from step S1110 to step S1114 may be executed.

In step S1610, the authorization server 1420 returns the access token to the client 110.

In step S1612, the client 110 receives the access token.

Thereafter, the processing according to the flowchart shown in the example in FIG. 12 is executed.

With reference to FIG. 17, a hardware configuration example of the information processing apparatus (the client 110, the authorization server 120, the relay device 130, the load balancer 140, the application server 145) according to this exemplary embodiment is described. The configuration shown in FIG. 17 is formed of, for example, a personal computer (PC), and is a hardware configuration example including a data reading unit 1717 such as a scanner, and a data output unit 1718 such as a printer.

A central processing unit (CPU) 1701 is a controller that executes processing of the aforementioned various modules described in the exemplary embodiments, that is, the client 110, the authorization server 120, the relay device 130, the load balancer 140, the application server 145, the load balancer 230, the load balance processing module 235, the authorization server 920, the relay device 930, the load balancer 1030, the load balance processing module 1035, the authorization server 1420, the relay device 1430, the load balancer 1530, the load balance processing module 1532, etc., or processing according to a computer program having written therein execution sequences of the modules.

A read only memory (ROM) 1702 stores a program, an operation parameter, etc., used by the CPU 1701. A random access memory (RAM) 1703 stores a program used during the execution by the CPU 1701, a parameter that is properly changed during the execution, etc. The CPU 1701, the ROM 1702, and the RAM 1703 are mutually connected through a host bus 1704 formed of, for example, a CPU bus.

The host bus 1704 is connected to an external bus 1706 such as a peripheral component interconnect/interface (PCI) bus through a bridge 1705.

A keyboard 1708 and a pointing device 1709 such as a mouse are devices that are operated by an operator. A display 1710 is a liquid crystal display device, a cathode ray tube (CRT), or the like, and displays various information as text and image information. Alternatively, the display 1710 may be a touch screen or the like including both the functions of the pointing device 1709 and the display 1710.

A hard disk drive (HDD) 1711 includes a hard disk (or flash memory etc.) therein, drives the hard disk, and causes the hard disk to record or reproduce a program executed by the CPU 1701 and information. The hard disk realizes the function as the recording device 135 etc. Further, the hard disk stores various data and various computer programs.

A drive 1712 reads data or a program recorded in a mounted removable storage medium 1713, such as a magnetic disk, an optical disc, a magneto-optical disk, or a semiconductor memory, and supplies the data or program to the RAM 1703 connected through an interface 1707, the external bus 1706, the bridge 1705, and the host bus 1704. The removable storage medium 1713 may be also used as a data recording area.

A connection port 1714 is a port that connects an external connection device 1715, and has a connection portion, such as USB or IEEE 1394. The connection port 1714 is connected to the CPU 1701 and other units through the interface 1707, the external bus 1706, the bridge 1705, the host bus 1704, etc. A communication unit 1716 is connected to a communication line and executes data communication processing with an external device. The data reading unit 1717 is, for example, a scanner, and executes reading processing for a document. The data output unit 1718 is, for example, a printer, and executes output processing for document data.

The hardware configuration of the information processing apparatus shown in FIG. 17 is merely a configuration example. The configuration of any of the exemplary embodiments is not limited to the configuration shown in FIG. 17, and may be any configuration as long as the modules described in each of the exemplary embodiments may be executed. For example, a portion of the modules may be formed of dedicated hardware (for example, application specific integrated circuit (ASIC) or the like), a portion of the modules may be arranged in an external system and may be connected through a communication line, and further the system shown in FIG. 17 may be multiple systems mutually connected through a communication line and the multiple systems may operate in an associated manner. Alternatively, in particular, a portion of the modules may be arranged in any of a mobile information communication apparatus (including a mobile phone, a smart phone, a mobile device, a wearable computer, and so forth), a home information appliance, a robot, a copier, a facsimile, a scanner, a printer, and a multiple-function device (an image processing apparatus having at least two functions of a scanner, a printer, a copier, and a facsimile), instead of a personal computer.

In the above-described exemplary embodiments, the example of combining the relay device 130 and the load balancer 140 with each other has been described. However, the relay device 130 and the authorization server 120 may be combined, or the relay device 130, the authorization server 120, and the load balancer 140 may be combined.

Also, as an example of a combination between the first exemplary embodiment and the second exemplary embodiment, the processing according to the first exemplary embodiment may be executed until a predetermined condition is satisfied, and after the predetermined condition is satisfied, the processing according to the second exemplary embodiment may be executed. The predetermined condition in this case may be, for example, a condition that the memory capacity usable for the recording device 135 reaches a predetermined memory capacity (for example, the maximum memory capacity usable for the recording device 135) or a condition that the processing period according to the first exemplary embodiment reaches a predetermined period.

The above-described program may be stored in a storage medium and provided. Alternatively, the program may be provided by a communication measure. In this case, for example, the above-described program may be interpreted as an aspect of the invention of "a computer-readable medium storing a program."

"The computer-readable medium storing the program" represents a computer-readable medium storing a program, the medium which is used for, for example, installation, execution, and distribution of the program.

For example, the storage medium may include a digital versatile disk (DVD), particularly, "DVD-R, DVD-RW, DVD-RAM, and the like" complying with the standard formulated by the DVD forum, "DVD+R, DVD+RW, and the like" complying with the standard formulated as DVD+RW; a compact disc (CD), particularly, a compact disc read only memory (CD-ROM), a compact disc recordable (CD-R), a compact disc rewritable (CD-RW), and the like; a Blu-ray (registered trademark) disc; a magneto-optical disk (MO); a flexible disk (FD); a magnetic tape; a hard disk; a read only memory (ROM); an electrically erasable programmable ROM (EEPROM, registered trademark); a flash memory; a random access memory (RAM); a secure digital (SD) memory card; and the like.

The entirety or a portion of the above-described program may be recorded in the storage medium, and may be stored and distributed. Also, the above-described program or a portion of the program may be transmitted by using a wired network, a wireless communication network, a transmission medium with a combination of the wired network and the wireless communication network, used for a local area network (LAN), a metropolitan area network (MAN), a wide area network (WAN), the Internet, an intranet, an extranet, or the like; or may be carried on a carrier wave.

Further, the program may be the entirety or a portion of another program, or may be recorded in a storage medium together with a different program. Alternatively, the program may be divided and recorded in plural recording media. Also, the program may be recorded in any form, for example, a compressed form or an encrypted form, as long as the program may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
   a client computer which sends a request;
   a relaying computer;
   a load balancing computer; and
   a plurality of servers,
   wherein the relaying computer comprises a central processing unit (CPU) programmed to
   receive a first request from the client computer;

transmit the first request to the load balancing computer;
receive a response to the first request from the load balancing computer, the response being created by one of the plurality of servers;
cause a storage device to store first information applied to the first request, and second information applied to the response, in an associated manner; and
transmit the response from which the second information is deleted, to the client, and
wherein the load balancing computer comprises a CPU programmed to
receive the first request from the relaying computer;
transmit the first request to one of the plurality of servers;
receive the response from one of the plurality of servers; and
transmit the response, to which the second information being applied, to the relaying computer, and
wherein the first request comprises an API request, the first information comprises an access token that certifies that the client computer is authorized to use the plurality of servers, and the second information comprises a cookie issued by the load balancing computer that identifies one of the plurality of servers.

2. An information processing apparatus comprising a central processing unit (CPU) and instructions that program the CPU to:
receive a first request from a client;
transmit the first request to a load balancer;
receive a response to the first request from the load balancer;
cause a storage device to store first information applied to the first request, and second information applied to the response, in an associated manner; and
transmit the response from which the second information is deleted, to the client, and
wherein the first request comprises an API request, the first information comprises an access token that certifies that the client computer is authorized to use the plurality of servers, and the second information comprises a cookie issued by the load balancer that identifies one of the plurality of servers.

3. The information processing apparatus according to claim 2, wherein
in a case where a second request to which the first information is applied is received, the CPU is programmed to transmit the second request to the load balancer along with the second information, which is stored in association with the first information in the storage device.

4. The information processing apparatus according to claim 2,
wherein, the first information is acquired by a client from an authorization server.

5. An information processing apparatus comprising a central processing unit (CPU) and instructions that program the CPU to:
receive first information from an authorization server;
transmit a request to a load balancer;
receive second information applied to a response to the request, from the load balancer; and
transmit the second information to the authorization server, and
wherein the first information comprises an access token that certifies that a client computer is authorized to use a plurality of servers, and the second information comprises a cookie issued by the load balancer that identifies one of the plurality of servers.

6. The information processing apparatus according to claim 5, wherein the instructions further program the CPU to:
extract the second information from first information applied to a request received from a client, and apply the second information to the request; and
transmit the request, the first information, and the second information to a load balancer.

7. The information processing apparatus according to claim 5,
wherein, the first information is acquired by a client from an authorization server.

8. An information processing apparatus comprising a central processing unit (CPU) and instructions that program the CPU to:
receive information relating to a first user from an authorization server;
cause a storage device to store information relating to second users who made requests and a plurality of second information applied to responses received from a load balancer in response to each of the requests, in an associated manner;
retrieve information relating to at least one of the second users similar to the information relating to the first user; and
transmit second information corresponding to the retrieved information relating to the at least one of the second users, to the authorization server, and
wherein the requests comprise API requests, and the second information comprises a cookie issued by the load balancer that identifies one server of a plurality of servers.

9. The information processing apparatus according to claim 8, wherein the information relating to the first user and the second users includes at least one of (a) identification information of the first user and the second users, (b) identification information of a group to which the first user and the second users belong, (c) information indicating a role of the first user and the second users, and (d) information indicating a resource accessible by the first user and the second users.

10. A non-transitory computer readable medium storing a program causing a computer to execute a process for information processing, the process comprising:
receiving a first request from a client;
transmitting the first request to a load balancer unit;
receiving a response to the first request from the load balancer unit;
controlling to cause a storage device to store first information applied to the first request, and second information applied to the response, in an associated manner; and
transmitting the response from which the second information is deleted, to the client, and
wherein the first request comprises an API request, the first information comprises an access token that certifies that the client computer is authorized to use a plurality of servers, and the second information comprises a cookie issued by the load balancer unit that identifies one server of the plurality of servers.

11. A non-transitory computer readable medium storing a program causing a computer to execute a process for information processing, the process comprising:
receiving first information received from an authorization server;

transmitting a request to a load balancer unit;
receiving second information applied to a response to the request, from the load balancer unit; and
transmitting the second information to the authorization server, and
wherein the first information comprises an access token that certifies that a client computer is authorized to use a plurality of servers, and the second information comprises a cookie issued by the load balancer unit that identifies one server of the plurality of servers.

12. A non-transitory computer readable medium storing a program causing a computer to execute a process for information processing, the process comprising:
receiving information relating to a first user received from an authorization server;
controlling to cause a storage device to store information relating to second users who made requests and a plurality of second information applied to responses received from a load balancer unit in response to each of the requests, in an associated manner; and
retrieving information relating to at least one of the second users similar to the received information relating to the first user, and transmitting second information corresponding to the retrieved information relating to the at least one of the second users, to the authorization server, and
wherein the requests comprise API requests, and the second information comprises a cookie issued by the load balancer unit that identifies one server of a plurality of servers.

13. An image processing method comprising:
receiving a first request from a client;
transmitting the first request to a load balancer unit;
receiving a response to the first request from the load balancer unit;
controlling to cause a storage device to store first information applied to the first request, and second information applied to the response, in an associated manner; and
transmitting the response from which the second information is deleted, to the client, and
wherein the first request comprises an API request, the first information comprises an access token that certifies that the client computer is authorized to use a plurality of servers, and the second information comprises a cookie issued by the load balancer unit that identifies one server of the plurality of servers.

* * * * *